United States Patent [19]

Scharf

[11] 4,185,975
[45] Jan. 29, 1980

[54] EXHAUST FOR AN OPENING INTO A COATER

[75] Inventor: Donald R. Scharf, Amherst, Ohio
[73] Assignee: Nordson Corporation, Amherst, Ohio
[21] Appl. No.: 923,420
[22] Filed: Jul. 10, 1978
[51] Int. Cl.² ............................................. B01D 47/06
[52] U.S. Cl. ................................... 55/238; 261/79 A; 98/115 SB; 118/DIG. 7
[58] Field of Search ............ 55/237, 238, 242, 257 C; 261/79 A, DIG. 54; 98/115 SB; 118/610, 634, DIG. 7

[56] References Cited

U.S. PATENT DOCUMENTS

| | | | |
|---|---|---|---|
| 2,337,983 | 12/1943 | Fisher | 98/115 SB |
| 3,054,244 | 9/1962 | Hersh | 55/238 |
| 3,490,206 | 1/1970 | Doane | 55/242 |
| 3,810,349 | 5/1974 | Rebours | 261/79 A |
| 3,976,456 | 8/1976 | Alcock | 55/238 |

FOREIGN PATENT DOCUMENTS

| | | | |
|---|---|---|---|
| 35707 | 3/1930 | France | 55/238 |
| 385598 | 11/1973 | U.S.S.R. | 55/237 |
| 510252 | 5/1976 | U.S.S.R. | 55/257 C |

Primary Examiner—David L. Lacey

[57] ABSTRACT

A manifold is disclosed which prevents vapors created on the interior of a coater booth or the like from escaping into the atmosphere through openings into or out of the booth. The manifold comprises a hollow annular chamber situated around an opening and having apertures or holes through the smaller, radially inner wall. A baffle disposed interiorly of the manifold creates an air flow passage therein which extends in a type of spiraling manner from the holes in the radially inner walls, in a downwardly direction then around and under the radially inner wall, and then in an upwardly direction to an exhaust port for the vapors. A liquid spray nozzle spraying a precipitant downward in the downwardly extending portion of the vapor flow passage creates a vacuum which draws the vapors into the manifold through the holes in the radially inner wall, scrubs the vapors and causes the vapors to be expelled through the exhaust port where they can be controllably disposed of. A drain in the lower portion of the manifold allows the liquid precipitant to be disposed of.

7 Claims, 3 Drawing Figures

EXHAUST FOR AN OPENING INTO A COATER

FIELD OF THE INVENTION

This invention relates to vapor control for a booth having a contaminated atmosphere, and more particularly relates to a manifold to prevent vapors from issuing out of openings in the booth.

BACKGROUND OF THE INVENTION

Spray coating is a fairly diverse art. In some applications spray coating is done in the atmosphere, while in other applications it is performed in a chamber which is substantially closed, except perhaps for openings through which a product to be coated can be conveyed. Other openings into or out of the spray booth may also be present.

In some of the coating operations done in a chamber air can be tolerated in the chamber, while in other applications a solvent rich atmosphere is maintained.

In coating booths utilizing a solvent rich atmosphere, the coating material is generally atomized hydraulically and directed onto a substrate to be coated. By hydraulic atomization, it is meant that the coating material is atomized by means of a special type of orifice through which coating material is pumped at a high hydraulic pressure on the order of 300 to 3000 psi. No compressed gas is generally used in such systems to effect the atomization. When the coating material is sprayed some of the solvent present in the coating material evaporates upon discharge from the nozzle. Shortly, the solvent vapors displace any air which is in the interior of the coating chamber and provide a solvent rich atmosphere.

Solvent rich atmosphere coaters result in a condition within the spray booth where oversprayed material does not solidify on the interior of the chamber walls, or other interior surfaces. Such coaters exhibit other advantageous results known to those skilled in the art.

Of necessity, most coating booths have openings in them, for example, the opening through which a product to be coated is conveyed. Such is usually true of the coaters utilizing a solvent rich atmosphere, and as these processes are generally continuous operations, the solvent vapors which are being added to the atmosphere of the coater must be removed lest they escape through any openings into or out of the coating chamber. The vapors and contaminated atmosphere removed can then be filtered or recycled or both.

It is significant to note that any exhaust system used to prevent the vapors from escaping from the openings in a booth having a solvent rich atmosphere, need not and usually should not create a large amount of vapor flow. A large amount of vacuum or vapor flow would result in a condition where air could be drawn into the coating chamber whereupon the advantages of the solvent rich atmosphere would be defeated.

Prior art methods of preventing the vapors from issuing through the holes were inadequate for many applications. Many systems provided too much vacuum, and hence excessive flow volume from the chamber for certain applications, such as solvent rich atmosphere coaters. Other systems were built into the chamber itself and were difficult if not impossible to add to an existing system. Further, many of these prior art devices were bulky and required an excessive amount of space for installation. Further, the prior art devices were rather complex structures, both in terms of their mode of operation, and assembly. Further, complex assembly procedures added expense to the manufacture of such devices.

The present invention provides an improved manifold assembly for containing the vapors which might issue from a coating chamber. Various aspects of the present invention combine to result in a maifold which is simple in its design and air flow characteristics, and can provide good controllability of small negative pressures to result in small air flow volumes necessary to many applications. Further, various aspects combine to provide a compact, less complex, and less costly device which can be easily added to existing coating chambers.

Although the present invention has particular application to coating booths having a solvent rich atmosphere, it will be recognized by those skilled in the art that the manifold of the present invention will have uses in conjunction with other types of booths having a contaminated atmosphere as well.

The manifold comprises a front wall and a rear wall, both having apertures therethrough leading to an opening into or out of the coater. A side wall assembly is provided and attached to the front and rear walls to form a hollow chamber around the apertures. A collar is provided around the aperture and is attached to the front and rear walls. It is constructed so as to have or form holes therethrough to allow vapors issuing out of the opening in the coating chamber to be drawn into the manifold. Baffle means are provided in the manifold chamber creating a generally downward then upward vapor flow passage from and generally around the collar. A spray nozzle adapted to spray a precipitant such as water in a generally downward direction in the vapor flow passage is provided to create a venturi effect in the vapor flow passage which causes vapors to be drawn into the manifold. The sprayed precipitant also acts to scrub the vapors drawn through the air flow passage and cause paint particles and other contaminants to be precipitated out of the vapor. Drain means are provided at the lower portion of the chamber to remove the precipitants and precipitated contaminants. An exhaust port for the scrubbed vapors is provided in the vapor flow passage and is located above the drain means and downstream of the spray nozzle.

BRIEF DESCRIPTION OF THE DRAWINGS

The invention can be more fully appreciated by reference to the accompanying drawing figures in which.

DESCRIPTION OF THE PREFERRED EMBODIMENT

Figure 1:
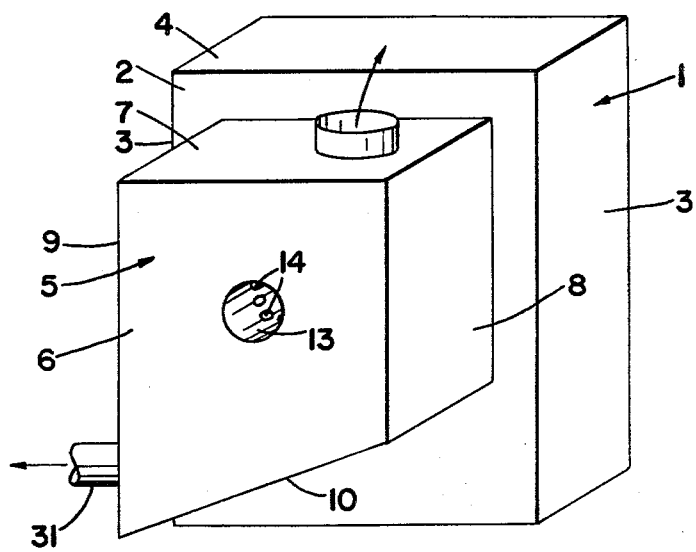
FIG. 1 is a perspective view of the exterior of a coater having an exhaust manifold around an opening into the coater.

FIG. 1 shows a perspective view of a coater 1 being a closed chamber comprising a front wall 2 side walls 3 a top wall 4 and bottom and rear walls (not visible). A product opening 12 is provided in the front wall 2 of the coater so as to provide passage for a product to be coated. Surrounding the product opening 12 is a manifold generally designated as 5. The manifold 5 serves to exhaust vapors which might otherwise escape through the opening 12 in the front wall 2 of the coater 1. The manifold comprises a substantially closed chamber defined by a front wall 6, rear wall 11, top wall 7, side walls 8 and 9 and bottom wall 10 (see FIGS. 2 and 3) wherein the front and rear walls have an aperture in them which combine so as to lead to the product opening 12 of the coater 1.

Figure 2:
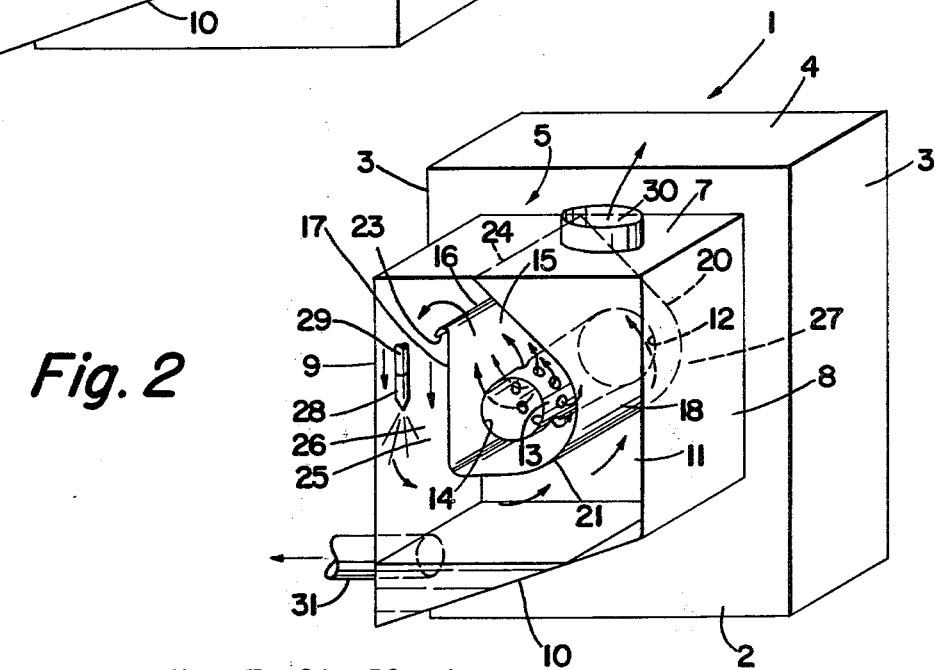
FIG. 2 is a partially fragmentary perspective view of the apparatus of FIG. 1.
Figure 3:
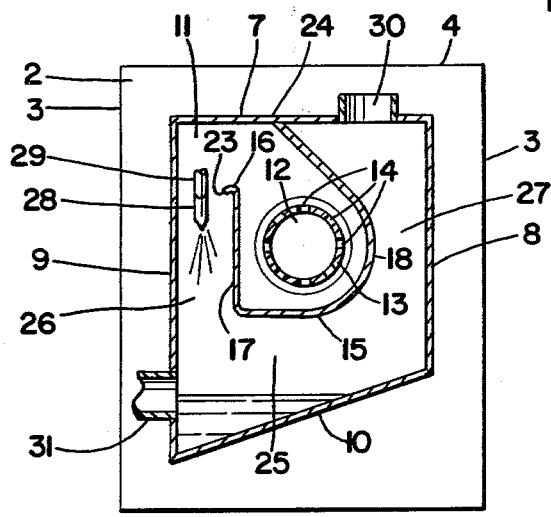
FIG. 3 is a cross sectional view of the manifold of FIG. 1.

Referring now to FIGS. 2 and 3 the interior details of the manifold can be more fully appreciated. The manifold chamber of the present embodiment is generally of a square or rectangular shape but having an oblique bottom 10 sloping to one side so as to cause any liquids in the manifold 5 to flow to a drain 31. The drain 31 can be located almost anywhere in the lower portion of the manifold, as desired for convenience, and therefore the lower portion of the manifold 5 could be made in other shapes which cause liquid to flow toward the drain 31. A side wall assembly comprising the top wall 7, side walls 8 and 9 and bottom wall 10 combines with a collar 13 to create a hollow annular type chamber around the opening 12 of the coater 1 and around the apertures in the front wall 6 and rear wall 11 of the manifold 5.

The collar 13 is attached to the front and rear walls 6 and 11 respectively of the manifold 5 and in this embodiment is made in a cylindrical shape, and constitutes in effect a radially inner wall of the hollow annular chamber. Holes 14 to the interior of the chamber are formed in the collar 13. Any vapors which would otherwise issue from the coater 1 through the opening 12 are drawn into the holes 14 in the collar as the result of a vacuum created therearound as will be discussed in more detail below. The placement and size of holes 14 formed in the radially inner wall by the collar 13 are selected so as to create adequate draft around the whole periphera of the product opening 12 of the coater 1. The size and placement of these holes may vary depending on the nature of the vapors and currents within the coater and can be predetermined through simple experimentation, well within the capability of a person skilled in the art.

A baffle 15 is disposed in the annular chamber and curves partially around the collar 13 and the aperture in the front wall 6 and rear wall 11 of the manifold 5. The baffle 15 in this embodiment is continuous and generally "U" shaped having two upwardly extending portions 17 and 18. The baffle 15 has first and second side edge portions 20 and 21 respectively, and two end portions 23 and 24 respectively. The side edge portions 21 and 22 are sealed to the front and rear walls 6, 11 respectively. One end portion 24 of the baffle 15 is sealed to the top wall 7 of the manifold 5. The other end 23 of the baffle 15 is unattached, and has a lip 16 curving oppositely of the remainder of the baffle 15. Thus, the baffle has a portion 17 extending downwardly from the lip 16, and thereafter curving around the collar 13 has an upward extending portion 18 which terminates in the sealed attachment of the second end 24 of the baffle 15 to the top wall 7.

Thus, the baffle creates a vapor flow passage 25 having a generally outward spiralling effect which proceeds upward from the opening 12 in the coater 1; thence around the lip 16 at the unattached end 23 of the baffle 15; thence proceeds to a downwardly flowing portion 26 of the vapor flow passage, around and under the lower portion of the baffle 15 and collar 13; and thereafter upwardly in an upwardly flowing portion 27 of the vapor flow passage 25 to a vapor exhaust port 30, so as to create a vapor flow passage 25 spiralling around but outwardly from the opening 12 in the coater, the collar 13 and the apertures in the front and rear walls 6 and 11 respectively.

A spray nozzle 28 for a precipitant is located between the portion 17 of the baffle 15 extending downward from the lip 16 and the side wall 9 of the manifold 5 and in this embodiment is positioned proximate the unattached end of the baffle 15. The nozzle is oriented so as to spray precipitant downward in the downward portion 26 of the air flow passage 25. The spray nozzle 28 is generally selected to provide a cone spray pattern so as to shower the side wall 9, front wall 6, downward extending portion 17 of the baffle 15, and rear wall 11 of the manifold with precipitant so as to clean these surfaces. In other configurations different spray patterns may be desirable. A hose 29 shown schematically provides precipitant under pressure to the nozzle 28. The sprayed precipitant has the effect of cleaning the walls of the flow passage and scrubbing the contaminated vapors prior to discharge so as to significantly reduce the contamination level of any vapors escaping through the product opening 30.

Precipitant which is sprayed from the nozzle 28 and precipitated coating material, vapors and contaminants collect in the lower portion of the manifold and are disposed of through a drain 31 in the lower portion of the manifold 5. The exhaust port 30 for the scrubbed vapors is located downstream of the spray nozzle 28 at a position elevated with respect to the drain 31 in the upwardly extending portion 27 of the air flow passage 25. In practice a hood providing a slight draft can be provided to draw the vapors issuing from the vapor discharge port 30 out of the work area.

In operation the precipitant issuing from the spray nozzle 28 creates a venturi effect in the downwardly extending portion 26 of the air flow passage 25 to create the gentle exhaust vacuum or suction or negative pressure required to cause vapors issuing from the product opening 12 to be drawn into the apertures 14 in the collar 13 rather than escaping into the atmosphere. Thus, it can be seen that the preferred embodiment of this invention is simple in design yet efficient in operation and compact in installation.

It will be appreciated by those skilled in the art that many modifications can be made to the preferred embodiment without departing from the scope of the invention of which I claim:

1. An exhaust apparatus for an opening in a coater comprising:
   a front wall and a rear wall, both having apertures therethrough combining to at least partially define a generally straight passage through said exhaust apparatus and adapted to lead to the interior of the coater through the exhaust apparatus and through the opening in the coater;
   a side wall assembly attached to said front and rear walls to form a chamber around said apertures;
   a collar means around said apertures and attached to said front and rear walls, and having holes therethrough to allow vapors issuing out of the opening in the coater to be drawn into said chamber in a predetermined manner;
   baffle means in said chamber at least partially defining a generally downward then upward vapor flow passage from said holes in the collar means;
   a spray nozzle positioned and arranged to spray a precipitant in a generally downward direction in said downward vapor flow passage and scrub vapors therein;

a drain at the lower portion of said chamber; and an exhaust port for scrubbed vapors in said vapor flow chamber, elevated above said drain and downstream of said spray nozzle in said vapor flow passage.

2. The apparatus of claim 1 wherein said baffle means at least partially defines a vapor flow passage which spirals outward from and generally around said collar means to said exhaust port.

3. The apparatus of claim 2 wherein said spray nozzle is located between said baffle means and said side wall assembly, upstream of said exhaust port in said vapor flow passage.

4. An exhaust apparatus for an opening in a coater comprising:

a front and a rear wall, both having apertures therethrough combining to at least partially define a passage through the exhaust apparatus and adapted to lead to the interior of the coater through the exhaust apparatus and through the opening in the coater;

a side wall assembly attached to said front and rear walls to form a chamber around said apertures;

collar means around said apertures and attached to said front and rear walls, and having holes therethrough to allow vapors issuing out of the opening in the coater to be drawn into said chamber in a predetermined manner;

a baffle having first and second side portions and first and second end portions located in said chamber and curving around said apertures from a first upward extending portion to a second upward extending portion, having the first side portion attached to said front wall and a second side portion attached to the rear wall, and the first end attached to said side wall assembly to at least partially define a vapor flow passage around said opening curving in a generally downward flowing direction and thereafter in a generally upward flowing direction;

a spray nozzle positioned and arranged to spray precipitant generally downward in the portion of said vapor flow passage causing a generally downward flow of vapors;

a drain in the lower portion of said chamber; and a vapor exhaust port elevated above said drain, and located in said upward portion of said vapor flow passage.

5. An exhaust apparatus for an opening in a coater wall comprising:

a front wall and a rear wall, both having apertures therethrough combining to at least partially define a generally straight passage through said exhaust apparatus and adapted to lead to the interior of the coater through the exhaust apparatus and through the opening in the coater;

a side wall assembly attached to said front and rear walls to form a chamber around said apertures;

a collar means around said apertures and attached to said front and rear walls, and having holes therethrough to allow vapors issuing out of said opening to be drawn into said chamber in a predetermined manner;

a continuous baffle having first and second side edges, and first and second end portions wherein said first and second side edges are sealed to said front and rear walls respectively, and the first end portion is sealed to the side wall assembly, and wherein said second end is unattached to said side wall assembly so as to define a vapor flow passage curving around and below said collar means between said baffle and said side wall assembly, from said collar means, in a generally downward direction then in a generally upward direction;

a spray nozzle positioned and arranged to spray precipitant generally downward in said spray passage proximate said second end of said baffle between said baffle and said side wall assembly;

a drain in the lower portion of said chamber for sprayed precipitant and precipitated coating material and contaminants; and an exhaust port positioned in said vapor flow passage and located proximate the first end of said baffle, downstream of said spray nozzle and elevated with respect to the drain.

6. The apparatus of claim 5 wherein the baffle is a generally "U" shaped member.

7. The apparatus of claim 6 wherein the spray nozzle comprises means to produce a cone pattern which impinges on the front and rear walls and the side wall assembly and the baffle.

* * * * *